United States Patent [19]

Sobotowski

[11] Patent Number: 4,955,328

[45] Date of Patent: Sep. 11, 1990

[54] LEADING PISTON ENGINE WITH TWO CYLINDERS INTERCONNECTED THROUGH A TRANSFER PORT

[75] Inventor: Rafal A. Sobotowski, Bay Village, Ohio

[73] Assignee: Standard Oil Company, Cleveland, Ohio

[21] Appl. No.: 429,700

[22] Filed: Oct. 31, 1989

Related U.S. Application Data

[63] Continuation-in-part of Ser. No. 234,561, Aug. 19, 1988, Pat. No. 4,876,922.

[51] Int. Cl.$^5$ ............................................. F02B 25/08
[52] U.S. Cl. ............................... 123/51 R; 123/52 A; 123/70 R
[58] Field of Search ............ 123/51 A, 51 AA, 51 B, 123/51 BA, 52 A, 70 R, 70 V, 48 B, 78 F, 51 R

[56] References Cited

U.S. PATENT DOCUMENTS

| | | | |
|---|---|---|---|
| 1,731,590 | 10/1929 | Roche | 13/70 R |
| 2,551,478 | 5/1951 | Wagers | 123/70 V |
| 3,446,192 | 5/1969 | Woodward | 123/51 A |
| 3,537,437 | 11/1970 | Paul et al. | 123/52 A |
| 3,570,459 | 3/1971 | Combs | 123/52 A |
| 3,675,630 | 7/1972 | Stratton | 123/70 R |
| 4,211,082 | 7/1980 | Bristol | 123/70 R |
| 4,781,155 | 11/1988 | Brucker | 123/70 V |
| 4,860,701 | 8/1989 | Jackson | 123/51 A |

FOREIGN PATENT DOCUMENTS

| | | | |
|---|---|---|---|
| 0142371 | 6/1980 | Fed. Rep. of Germany | 123/70 R |
| 3412662 | 10/1985 | Fed. Rep. of Germany | 123/70 R |

Primary Examiner—David A. Okonsky
Attorney, Agent, or Firm—John C. Evans

[57] ABSTRACT

A compression ignition, internal combustion engine has at least one pair of pistons operating in separate cylinders interconnected through a transfer port. Said at least one pair of pistons includes a leading piston linked to a leading crankshaft and operating in a leading cylinder, and a trailing piston linked to a trailing crankshaft and operating in a trailing cylinder. For the purpose of varying the compression ratio, the phase relation between said leading and trailing pistons is varied by means of a phase adjustment mechanism which operatively couples the leading and trailing crankshafts of the engine. The fuel is injected into the leading cylinder by means of a centrally situated multi-hole fuel injector. The clearance volume of the trailing cylinder is at a practical minimum in order to maximize the amount of air available for combustion in the leading cylinder. The combustion bowl in the leading cylinder extends over substantially the whole top surface of the leading piston so as to eliminate the stepwise changes of combustion chamber shape associated with compression ratio variation.

1 Claim, 10 Drawing Sheets

LEADING PISTON ENGINE WITH TWO CYLINDERS INTERCONNECTED THROUGH A TRANSFER PORT

This application is a continuation-in-part application of U.S. Ser. No. 234,561 filed Aug. 19, 1988 and now U.S. Pat. No. 4,876,922.

The invention relates to internal combustion engines and more particularly to combustion chambers for reciprocating, variable compression ratio, compression ignition, internal combustion engines.

For the purpose of this application, the term compression ratio is defined as the maximum cylinder volume divided by minimum cylinder volume. The term VCR means variable compression ratio. The term CI signifies compression ignition.

BACKGROUND OF THE INVENTION

In internal combustion engines, it is desirable to vary compression ratio during engine operation. Compression ratio strongly affects in-cylinder processes and provides an exceptional degree of control over engine performance.

Conventional engines, however, have fixed compression ratios. Their performance is a compromise between conflicting requirements.

The provision of variable compression ratio in compression ignition engines improves exhaust emission characteristics, overall fuel efficiency, cold startability and multi-fuel capability. It provides control over peak cylinder pressures and therefore permits considerable increase of specific power output through supercharging without sacrificing engine durability.

The present invention is applicable to a category of reciprocating VCR engines in which compression ratio is varied by altering the phase relation between two pistons operating in separate cylinders interconnected through a transfer port.

In VCR engines of this category, compression ratio is defined as maximum combined cylinder volume divided by minimum combined cylinder volume. The combined cylinder volume is the sum of individual cylinder volumes at any instant and the transfer port volume.

Compression ratio is maximum when both pistons move in phase, reaching their respective top dead center positions simultaneously. Any phase shift from that maximum compression ratio phase relation alters compression ratio by changing both the maximum and the minimum combined cylinder volume. Said phase shift is measured in terms of crank angle relative to a phase relation which corresponds to the two pistons reaching their respective top dead center positions simultaneously. The value of the phase shift angle can be arbitrarily assigned a positive or a negative sign to indicate whether the movement of one or the other piston is advanced or delayed relative to the combined cylinder volume changes. Within the phase shift angle range of practical interest in VCR engines, the greater the absolute value of the phase shift angle, the lower the compression ratio.

In practical application of this method of varying the compression ratio, the phase shift angle range need not include the zero value. In other words, the highest compression ratio utilized in an engine may correspond to a phase shift angle other than zero. On the other hand, certain applications may require that the phase shift angle range include zero as well as positive and negative values.

For the purpose of understanding the present invention, it will be assumed that the phase shift angle range is restricted to zero and those positive values which correspond to the compression ratio range of practical interest in VCR, CI, internal combustion engines. Furthermore, in each pair of pistons operating in interconnected cylinders, the piston whose movement is progressively advanced relative to combined cylinder volume changes as the phase shift angle is increased from zero will be termed the leading piston. Accordingly, the other piston of same pair will be referred to as the trailing piston since its movement is progressively delayed relative to combined cylinder volume changes as the phase shift angle is increased from zero. Engine cylinders will be referred to as leading or trailing, depending on whether leading or trailing pistons operate therein. Similarly, engine crankshafts will be termed leading or trailing based on whether the leading or trailing pistons are linked thereto.

The following prior art discloses mechanisms which vary compression ratio by altering the phase relation between two pistons operating in interconnected cylinders. These two pistons are generally linked to separate crankshafts and their phase relation is altered by varying the phase relation between those crankshafts. A multitude of such piston pairs may, of course, be incorporated in an engine.

U.S. Pat. No. 1,457,322 discloses a two crankshaft engine which employs a VCR mechanism comprised of helical gears, some of which are axially movable. Specifically, this mechanism includes two pairs of helical gears which couple the two crankshafts to an axially movable phase shaft. Each pair of those gears consists of a helical gear mounted on a crankshaft and, engaged therewith, a helical gear mounted on the axially movable phase shaft. The crankshafts ar situated side by side and the phase shaft transversely thereto. Helix angles and directions of helices of those gears are arranged to alter the phase relation between the two crankshafts in response to axial displacement of the phase shaft. The principal advantage of this VCR mechanism is mechanical simplicity. However, the location of the phase shaft in an extension of the crankcase results in a significant increase of engine length. In addition, the operation of helical gears on nonparallel shafts considerably reduces their load carrying capacity and/or useful life.

U.S.S.R. Pat. No. 300643 discloses a VCR mechanism which employs helical splines to vary the phase relation between two crankshafts of an opposed piston engine. The mechanism is incorporated in a transverse shaft geared to both crankshafts and consists of two separate helical spline couplings which couple two segments of the shaft to an axially movable member located coaxially between those segments. The helix angles and directions of helices of the splines are arranged to vary the phase relation between the two segments of the transverse shaft and, consequently, between the two crankshafts, in response to axial displacement of the movable member. The principal disadvantage of this VCR mechanism is the mechanical complexity of the whole crankshaft phasing system. Due to the sliding fit requirement and the resultant presence of backlash between mating surfaces, the durability of spline couplings which are subject to heavy alternating loads is also compromised. U.S. Pat. No. 3,961,607 discloses a two crankshaft VCR engine incorporating a planetary gear set in the crankshaft phasing system. The phase relation between crankshafts is varied by rotating the planetary gear carrier around its axis. This VCR mechanism is mechanically complex.

In 1984, an article authored by C. M. Bartolini, V. Naso and this inventor was published in a Polish journal, "Archiwum Termodynamiki", Vol. 5, No. 2. It disclosed a VCR mechanism employing two pairs of helical gears which couple the two crankshafts of the engine to an axially movable phase shaft. Each pair consists of a helical gear mounted on a crankshaft and, engaged therewith, a helical gear mounted on the movable phase shaft. The crankshafts are situated side by side and the phase shaft parallel thereto. The two crankshaft mounted gears are located at the opposite ends of the engine. Helix angles and directions of helices of the VCR mechanism gears are arranged to alter the phase relation between the two crankshafts in response to axial displacement of the phase shaft. In order to accommodate changes in the relative axial position of those gears associated with compression ratio variation, the face width of the crankshaft mounted gears is greater than the face width of the phase shaft mounted gears. This particular parallel configuration of the crankshaft and the phase shaft is favorable from the standpoint of gear durability and load carrying capacity but results in a considerable increase of engine length.

The method of varying compression ratio by altering the phase relation between two pistons operating in separate cylinders interconnected through a transfer port imposes a complex and unique combustion chamber configuration. Each combustion chamber in a VCR engine of this category consists of two interconnected chambers formed in the respective cylinders within the confines of the cylinder head, cylinder liner and the top surface of the piston at any instant. The variation of the phase relation between pistons operating in each pair of those interconnected cylinders affects the phasing of individual cylinder volume changes relative to combined cylinder volume changes. It has a significant effect on the rate and timing of mass transfer between the two cylinders throughout the whole operating cycle of the engine.

A monography entitled "A New Type of Internal Combustion Engine" authored by V. M. Kushul and published in the U.S.S.R. in 1965, as well as U.S.S.R. Pat. Nos. 956827 and 1002627 disclose combustion systems characterized by combustion chambers situated in paired engine cylinders. However, these combustion systems relate to spark ignition engines, while the present invention is applicable to CI power plants. Furthermore, the phase relation between pistons operating in each respective cylinder pair is invariable. The said combustion systems therefore differ from the present invention in that their compression ratio is fixed.

A publication entitled "A Variable Volumetric Ratio, Self Ignition, Internal Combustion Engine" by Gilbert Avermaete of Luxemburg discloses a variable compression ratio CI engine having combustion chambers consisting of paired engine cylinders of unequal diameter. The compression ratio is varied by altering the phase relation between pistons operating in each respective cylinder pair. The combustion system is of the precombustion chamber category, the fuel being injected by a side-mounted pintle-type fuel injector into the smaller cylinder of each pair. This combustion system suffers from the drawbacks of precombustion chamber CI engines namely, excessive fuel consumption and extreme thermal loading of combustion chamber walls.

SUMMARY OF THE INVENTION

The present invention relates to combustion chambers for reciprocating, compression ignition, internal combustion engines of the aforementioned VCR category wherein the fuel is injected into the leading cylinder by means of a centrally situated multi-hole fuel injector.

The only combustion chamber of this type known to me was devised by the assignee of the present patent application and evaluated in a prototype engine designed specifically for that purpose.

Said prototype engine had a pair of pistons linked to separate crankshafts and operating in separate cylinders interconnected through a transfer port. Any change of the phase relation between the crankshafts altered the phase relation between the pistons and thus resulted in a change of compression ratio.

The two crankshafts of the prototype engine were coupled by means of a phase adjuster mechanism consisting of two pairs of helical phasing gears and an axially movable adjuster member rotating about an axis parallel to the axes of rotation of the crankshafts. Specifically, each crankshaft was coupled with the axially movable adjuster member by means of a separate pair of said phasing gears, each pair consisting of a gear fixedly mounted on a crankshaft and, operatively engaged therewith, a gear fixedly mounted on the adjuster member. Helix angles and directions of helices of the phasing gears were arranged to provide for the required change of the phase relation between the two crankshafts in response to axial displacement of the axially movable adjuster member.

In order to maximize the amount of air available for combustion in the leading cylinder, a squish zone was formed over essentially the whole top surface of the trailing piston, thus reducing to a minimum the clearance volume of the trailing cylinder. The resultant clearance volume of the leading cylinder was concentrated in a toroidal bowl situated centrally in the crown of the leading piston. Said in-piston bowl was surrounded by a squish zone.

The combustion system components incorporated in the leading cylinder of the prototype engine constituted an overall arrangement typical of conventional, direct injection, CI engines, especially because the fuel was injected into a centrally situated toroidal, in-piston combustion bowl surrounded by a squish zone. This arrangement therefore represented a direct application of conventional technology to an unconventional combustion system of the divided chamber category.

In the course of research conducted by the assignee of the present patent application using the aforesaid prototype engine, it was determined that the stepwise variability of combustion chamber geometry associated with compression ratio variation has a detrimental effect on engine performance and exhaust emissions.

Accordingly, an object of the present invention is to provide a combustion chamber configuration which will alleviate the effect of compression ratio variation on combustion chamber geometry thus improving fuel efficiency and reducing undesirable exhaust emissions.

In accordance with the present invention, this objective is achievable if the combustion bowl in the leading cylinder of the reciprocating, compression ignition, internal combustion engine of the aforesaid VCR category extends over substantially the whole top surface of the leading piston.

These and other features, objects and advantages of the present invention will be more fully understood from the following description of certain preferred embodiments taken together with the accompanying drawings:

DETAILED DESCRIPTION OF THE INVENTION

Figure 1:
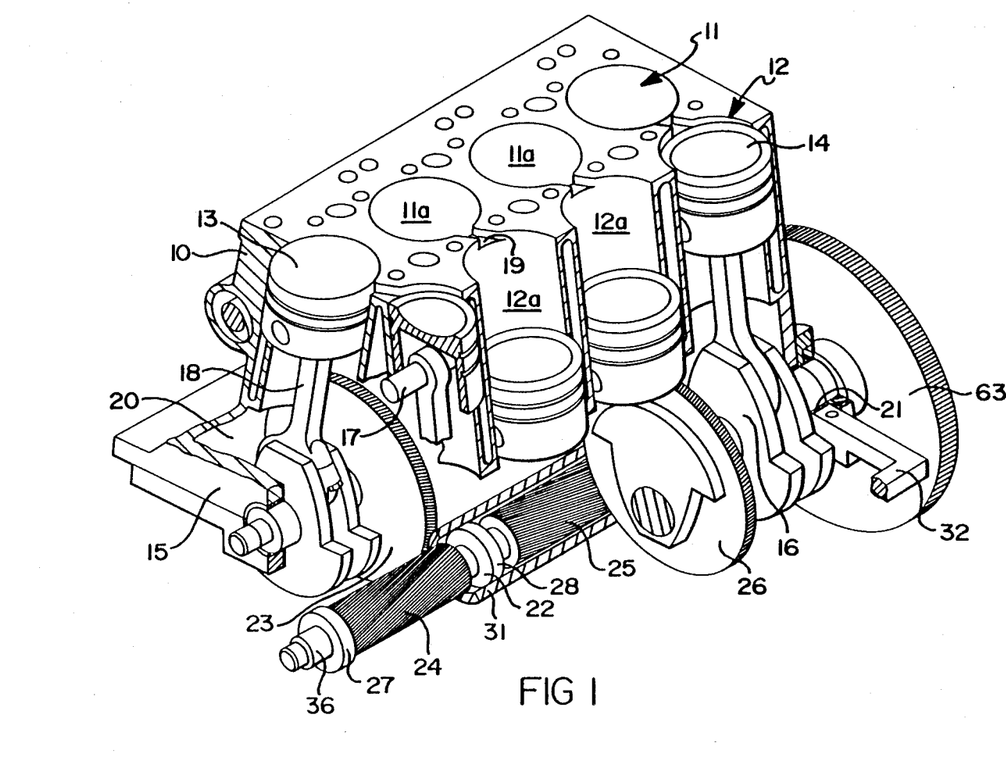
FIG. 1 is a compound axonometric section through an engine including a VCR mechanism.

Referring now to FIG. 1, an engine is shown having an engine block 10 comprising two cylinder banks 11 and 12 of four cylinders each. For purposes of illustration, the cylinder head of the engine has not been incorporated.

Pistons 13, 14 operating in the cylinder banks 11, 12 are linked to crankshafts 15, 16, respectively. The axes of rotation of crankshafts 15, 16 are parallel. The linkage between each piston 13, 14 of the engine and its respective crankshaft includes a wrist pin 17 and a connecting rod 18.

Crankshafts 15, 16 and cylinder banks 11, 12 are situated side by side.

Each cylinder 11a in bank 11 is interconnected with an adjacent cylinder 12a in bank 12 by means of a transfer port 19 located in block 10 near the top of cylinders 11a, 12a. In the specific case of the illustrated embodiment, the axes of both cylinders 11a, 12a which comprise each pair of interconnected cylinders lie within a single plane which is perpendicular to the axes of rotation of crankshafts 15, 16.

As shown in FIG. 1, the distance between the axes of rotation of crankshafts 15, 16 is at a practical minimum. Cylinder banks 11, 12 are inclined toward each other in order to further reduce the volume and surface area of transfer ports 19. It should be emphasized, however, that cylinder arrangements and crankshaft locations associated therewith other than shown in FIG. 1 are contemplated within the scope of this invention, including the twin crankshaft opposed piston engine configuration.

Crankshafts 15, 16 are supported in crankcase 20 by main bearings 21. An unusually simple and compact VCR mechanism is provided to couple the crankshafts 15, 16 and vary the phase relation therebetween. This mechanism includes an axially movable adjuster member 22 and helical phasing gears 23, 24, 25, and 26. Gear 23 is fixedly mounted on a crank web of crankshaft 15. Gears 24, 25 are fixedly mounted on the axially movable adjuster member 22 which rotates about an axis parallel to the axes of rotation of crankshafts 15, 16. Gear 26 is fixedly mounted on a crank web of crankshaft 16. Each of phasing gears 24, 25 is bounded by a respective imaginary cylindrical surface whose axis coincides with and whose points are equidistant from the axis of rotation of said adjuster member 22, and whose diameter is equal to the outside diameter of that gear, and which extends axially along the length of engine block 10 and is situated wholly outside the envelope swept by each crankshaft 15, 16 and by the connecting rod means associated with that crankshaft.

Figure 2:
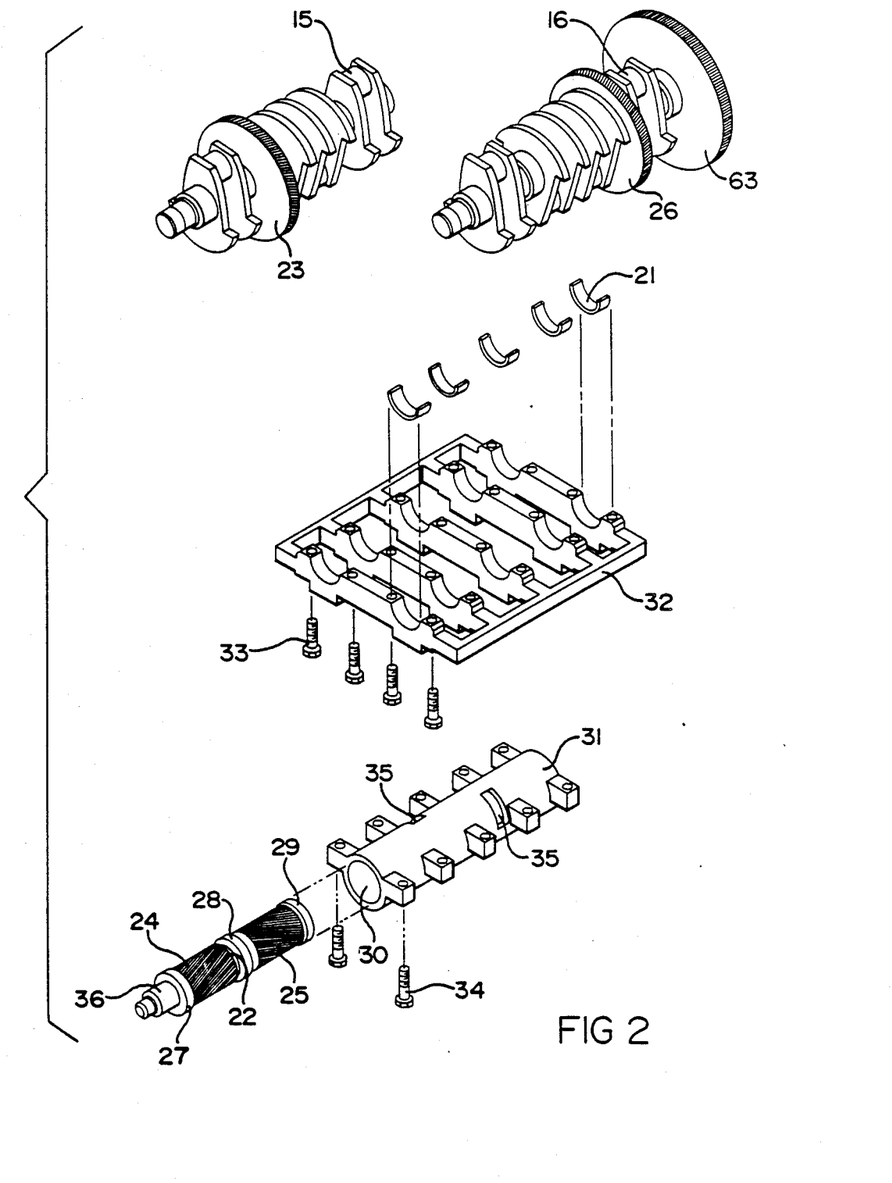
FIG. 2 is an exploded view of the VCR mechanism of FIG. 1.
Figure 3:
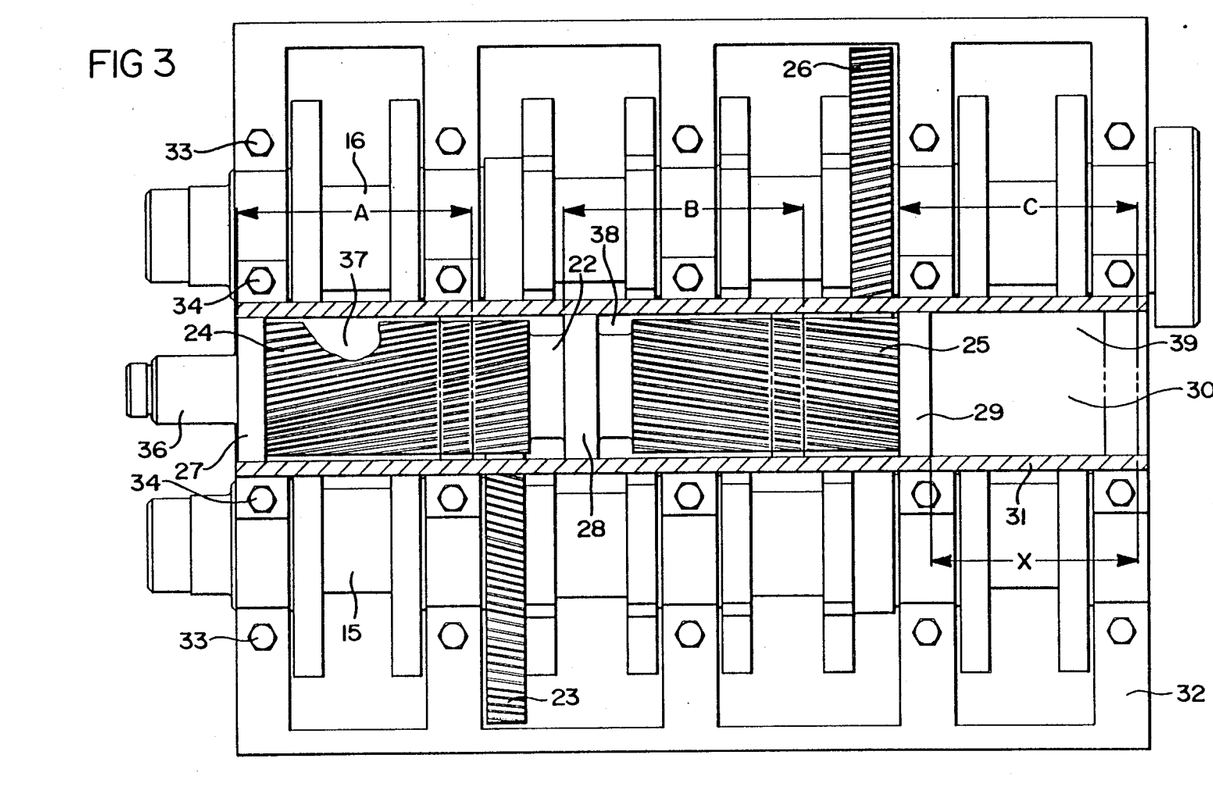
FIG. 3 is a bottom elevational view, partially sectioned, of the VCR mechanism of FIG. 1.

As illustrated in FIGS. 1-3, gears 23, 26 are offset relative to each other in the axial direction. Gear 23 is engaged with gear 24, while gear 26 is engaged with gear 25. The face widths of gears 24, 25 are greater than the face widths of gears 23, 26 so as to accommodate changes of the axial position of member 22 associated with compression ratio variation. The incorporation of narrow phasing gears 23, 26 in the crankshafts 15, 16 rather than in the axially movable adjuster member 22 minimizes the length of both crankshafts. The additional benefit of such a configuration is that the narrow phasing gears 23, 26 can now be incorporated on any crank web of a crankshaft with little, if any, effect on cylinder spacing. This allows optimization of the relative axial location of the crankshaft mounted phasing gears from the point of view of reducing the length and maximizing the stroke of the axially movable adjuster member.

The pitch diameters of gears 23, 26 are the same. The pitch diameters of gears 24, 25 are also the same. Crankshafts 15, 16 therefore rotate at equal angular velocities. However, other gear relationships may be contemplated within the scope of this invention to achieve any suitable angular velocity ratio between the two crankshafts 15, 16 of the engine.

The helix angles and directions of helices of phasing gears 23, 24, 25 and 26 are selected to provide for the required change of the phase relation between crankshafts 15, 16 in response to axial displacement of the axially movable adjuster member 22. In the illustrated embodiment, the helix angles of all phasing gears are equal and the directions of helices in gears 24, 25 mounted on member 22 are opposite.

Referring now to FIG. 2, which shows in more detail the bottom part of the engine, the axially movable adjuster member is supported for rotary motion by three radial sliding bearings. Specifically, this is accomplished by incorporating three bearing journals 27, 28, 29 in member 22. Journals 27, 28, 29, equal in diameter, are supported on a cylindrical bearing surface 30 of housing 31 Bedplate 32 which forms a single structural element incorporating all crankshaft main bearing caps also serves as a support of housing 31. Bedplate 32 is bolted to engine crankcase walls by means of bolts 33, while housing 31 is, in turn, attached to bedplate 32 by means of bolts 34. Cutouts 35 are provided in housing 31 to enable engagement of gear 23 with gear 24 and gear 25 with gear 26.

It will be noted that any actuating and control means may be used to vary the axial position of the axially movable adjuster member 22 for the purpose of varying compression ratio. Trunnion 36 provides support for thrust bearing means, not shown, which couple member 22 with an actuating mechanism, also not shown.

In FIG. 3, the axially movable adjuster member 22 is shown at an end point of its stroke X. The outline of member 22 in its other end point position is also indicated. A, B and C indicate the lengths of bearing surfaces 37, 38, 39 integral with surface 30, which mate with journals 27, 28, 29 respectively, as member 22 is displaced between the end points of its stroke.

The diameter of journals 27, 28, 29 is greater than the outside diameter of gears 24, 25, while the length of journals 27, 28, 29 is less than the length of their mating bearings surfaces 37, 38, 39. Relative to prior art designs, this arrangement simultaneously reduces the length of the axially movable adjuster member, minimizes the length of the engine and allows an increase of both the stroke of the said adjuster member and the face width of phasing gears mounted thereon. Helix angles of phasing gears may therefore be reduced leading to a decrease of axial forces acting on engine crankshafts and the axially movable member.

Figure 4:
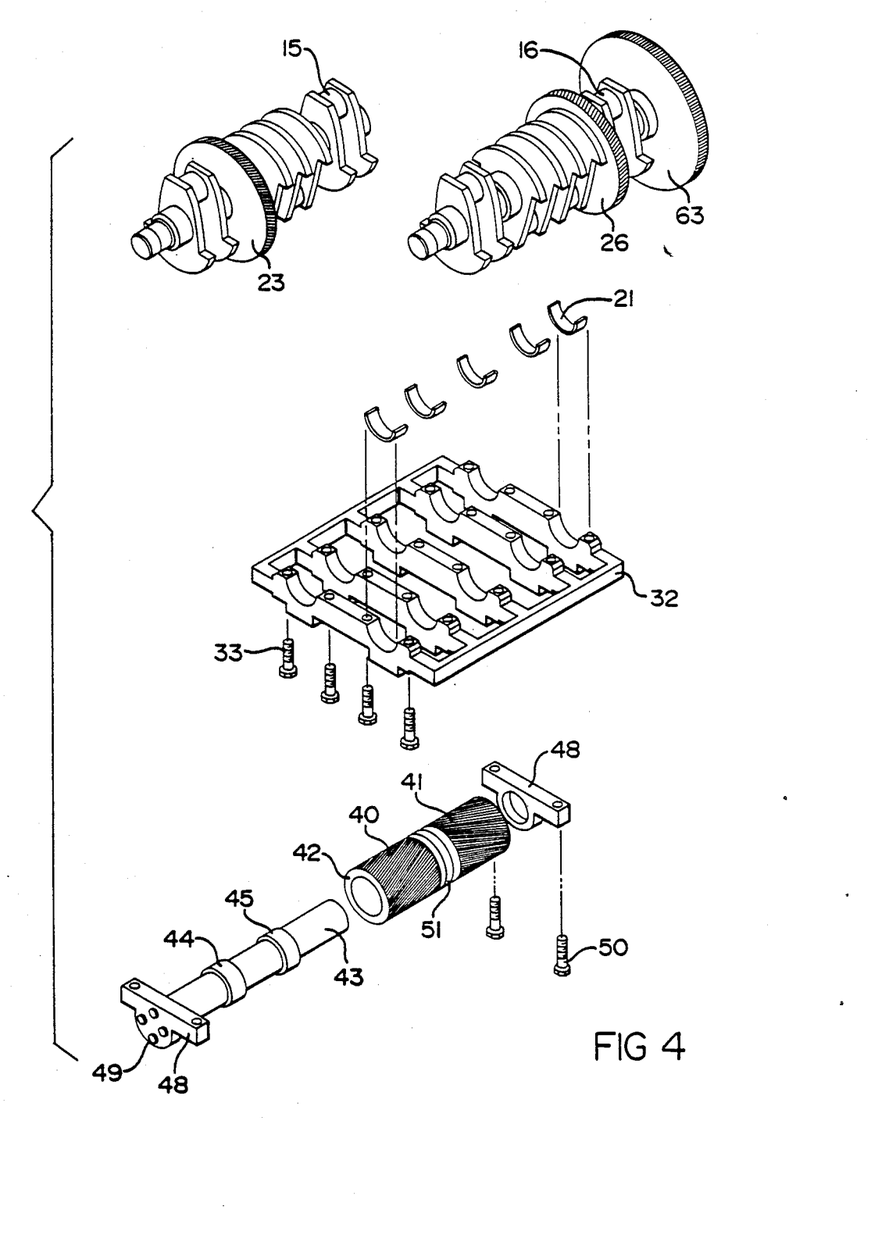
FIG. 4 is an exploded view of another VCR mechanism.

FIG. 4 shows an alternate embodiment of the VCR mechanism. This embodiment, designed to be incorporated in the engine illustrated in FIG. 1, is characterized by the axially movable adjuster member being rotatably supported on a stationary shaft by radial sliding bearings. Specifically, FIG. 4 shows helical phasing gears 40, 41 fixedly mounted on axially movable adjuster member 42 which rotates about an axis parallel to the axes of rotation of crankshafts 15, 16. Each of phasing gears 40, 41 is bounded by a respective imaginary cylindrical surface whose axis coincides with and whose points are equidistant from the axis of rotation of said adjuster member 42, and whose diameter is equal to the outside diameter of that gear, and which extends axially along the length of engine block 10 and is situated wholly outside the envelope swept by each crankshaft 15, 16 and by the connecting rod means associated with that crankshaft. Gears 40, 41 are engaged with gears 23, 26 fixedly mounted on crank webs of crankshafts 15, 16 respectively.

Gears 23, 26 are offset relative to each other in the axial direction. Face widths of gears 40, 41 are greater than face widths of gears 23, 26 in order to accommodate changes of the axial position of member 42 associated with compression ratio variation. The benefits of this face width relationship between the phasing gears are identical to those described in relation to the design of the VCR mechanism shown in FIGS. 1-3.

The pitch diameters of gears 23, 26 are the same. The pitch diameters of gears 40, 41 are also the same. However, other than shown gear relationships are contemplated within the scope of this invention to enable achieving any suitable velocity ratio between the two crankshafts 15, 16 of the engine.

Any references to the helix angles and directions of helices of phasing gears 23, 24, 25, 26 of the VCR mechanism illustrated in FIGS. 1-3 also apply to phasing gears 23, 40, 41, 26, respectively, of the VCR mechanism shown in FIG. 4.

Figure 5:
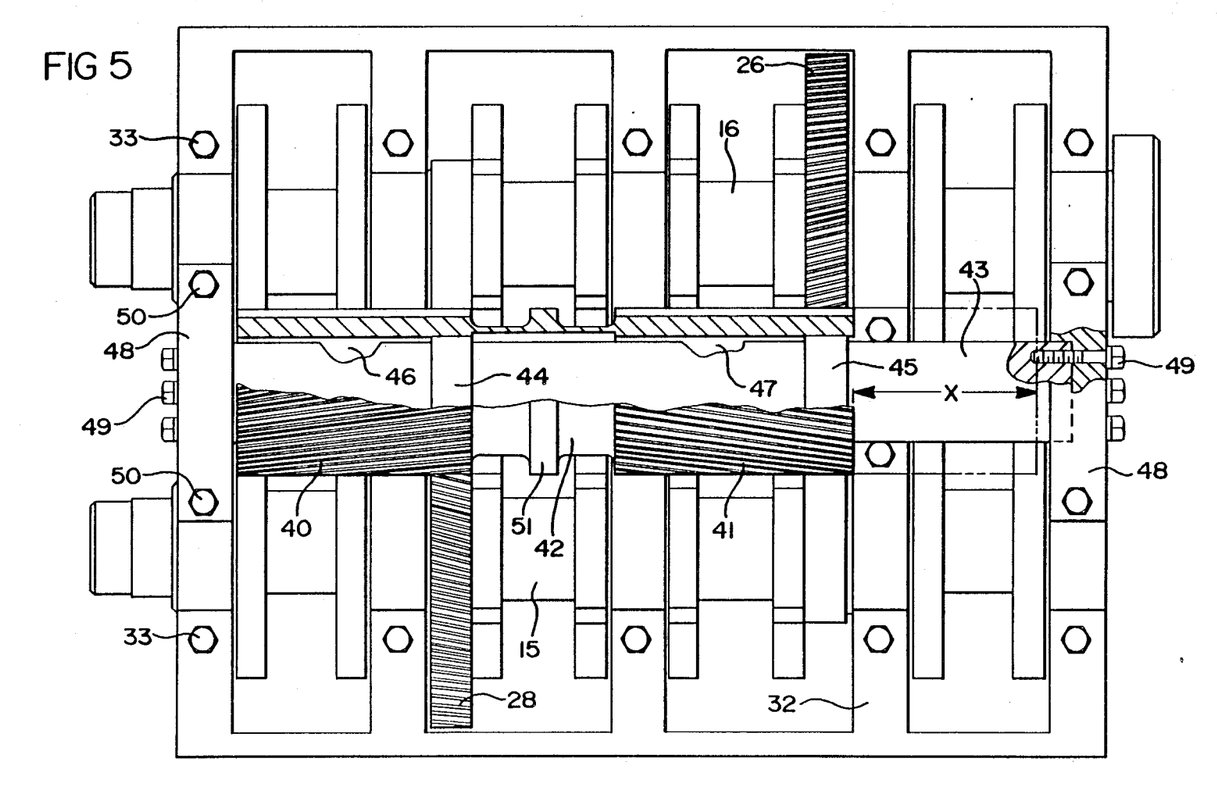
FIG. 5 is a bottom elevational view, partially sectioned, of the VCR mechanism of FIG. 4.

Referring now to FIG. 5, member 42 is rotatably supported on stationary shaft 43 by two radial sliding bearings consisting of journals 44, 45 equal in diameter, incorporated in said shaft 43 and mated with cylindrical bearing surfaces 46, 47 respectively, incorporated in member 42.

As shown in FIGS. 4 and 5, shaft 43 is fixedly mounted in two supports 48 by means of bolts 49. Supports 48 are, in turn, attached to bedplate 32 using bolts 50. Bedplate 32 which forms a single structural element incorporating all crankshaft main bearing caps of the engine is bolted to crankcase walls by means of bolts 33.

Referring again to FIG. 5, the axially movable adjuster member 42 is shown at an end point of its stroke X. Also shown is the outline of member 42 in its other end point position.

Flange 51 provides support for thrust bearing means, not shown, which couple member 42 with an actuating mechanism, also not shown. Any actuating and control means may be employed to vary the axial position of the axially movable adjuster member 42 for the purpose of varying compression ratio.

Figures 6, 6A:
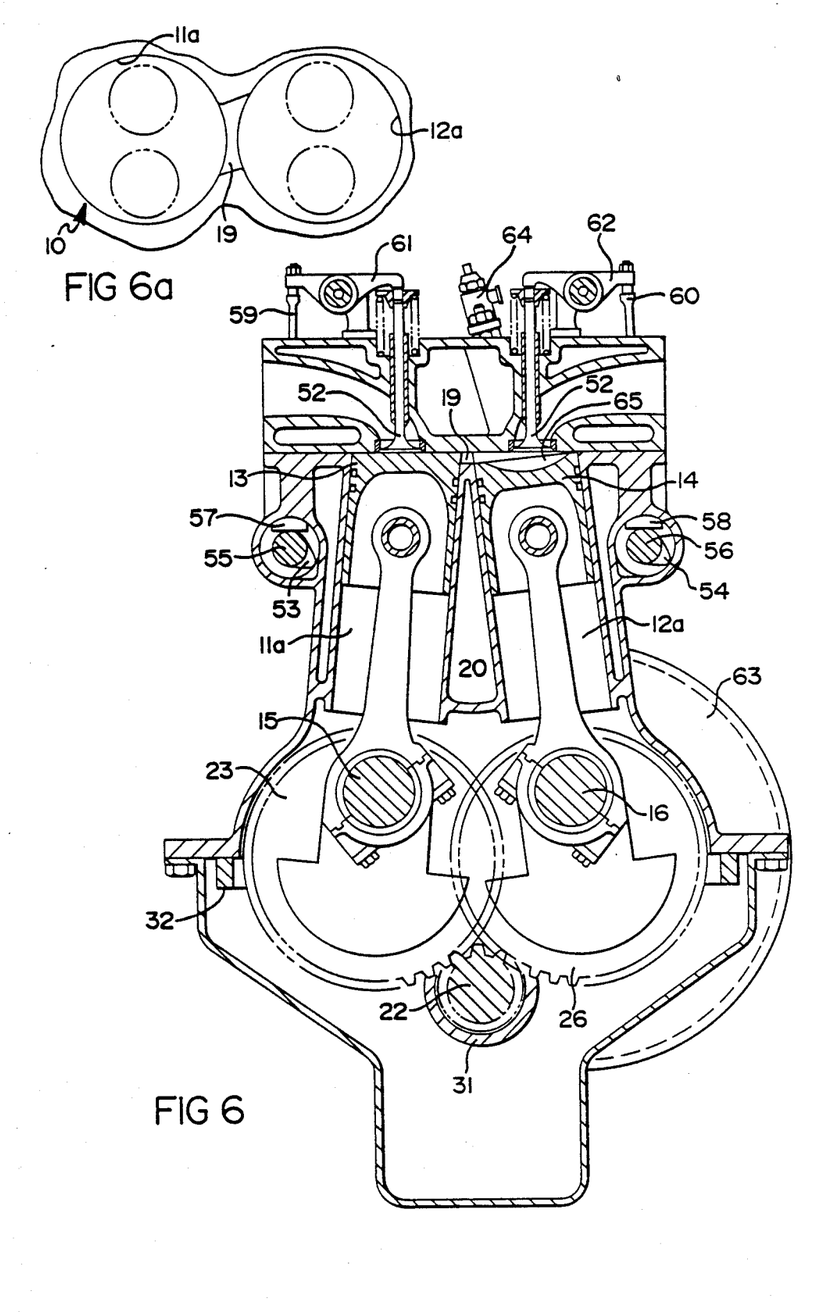
FIG. 6 is a transverse sectional view of the engine shown in FIG. 1.
FIG. 6A is a fragmentary top elevational view of the side-by-side cylinders of the engine shown in FIG. 1.

FIG. 6 is a transverse cross section of the engine shown in FIG. 1. Specifically, FIG. 6 illustrates pistons 13, 14 operating in their respective cylinders 11a, 12a interconnected through transfer port 19. Said pistons 13, 14 are shown in their respective top dead center positions.

For the purpose of the following discussion, it is assumed that the axially movable adjuster member 22 is situated at an end point of its stroke. It is also assumed that the helix angles and directions of helices of the phasing gears are arranged to result in the movement of pistons 14 being progressively advanced and the movement of pistons 13 being progressively delayed relative to combined cylinder volume changes as member 22 is displaced in the direction of the other end point of its stroke. Pistons 14 will, therefore, be referred to as leading pistons while pistons 13 will be referred as trailing pistons. Accordingly, crankshaft 16 will be referred to as leading crankshaft, while crankshaft 15 will be referred to as trailing crankshaft. Also, cylinders 12a will be referred to as leading cylinders, while cylinders 11a will be referred to as trailing cylinders.

Each cylinder of the engine shown in FIG. 6 is provided with an intake valve 52 and an exhaust valve, not shown. Cams 53 incorporated in camshaft 55 operate valves in cylinders 11a through cam followers 57, pushrods 59 and rocker arms 61. Cams 54 incorporated in camshaft 56 operate valves in cylinders 12a through cam followers 58, pushrods 60 and rocker arms 62. Camshaft 55 is driven by trailing crankshaft 15 while camshaft 56 is driven by leading crankshaft 16. Camshafts 55, 56 are coupled to their respective crankshafts by means of suitable drives, not shown, such as timing gears or chain drives. It is important to point out that changes of the phase relation between crankshafts 15, 16 associated with compression ratio variation directly affect the phase relation between camshafts 55, 56. While the timing of valve events in cylinders 11a, 12a remains unchanged relative to crank angle positions of crankshafts 15, 16 respectively, it varies with phase shift angle relative to combined cylinder volume changes.

Flywheel 63 is mounted on leading crankshaft 16.

The engine illustrated in FIG. 6 is of the compression ignition type. A multi-hole fuel injector 64 injects fuel into leading cylinder 12a.

In order to fully understand the combustion chamber configuration of the present invention, it is necessary to consider the design of the combustion chamber of the aforementioned VCR, CI, prototype engine developed by the assignee of the present patent application.

Figure 7:
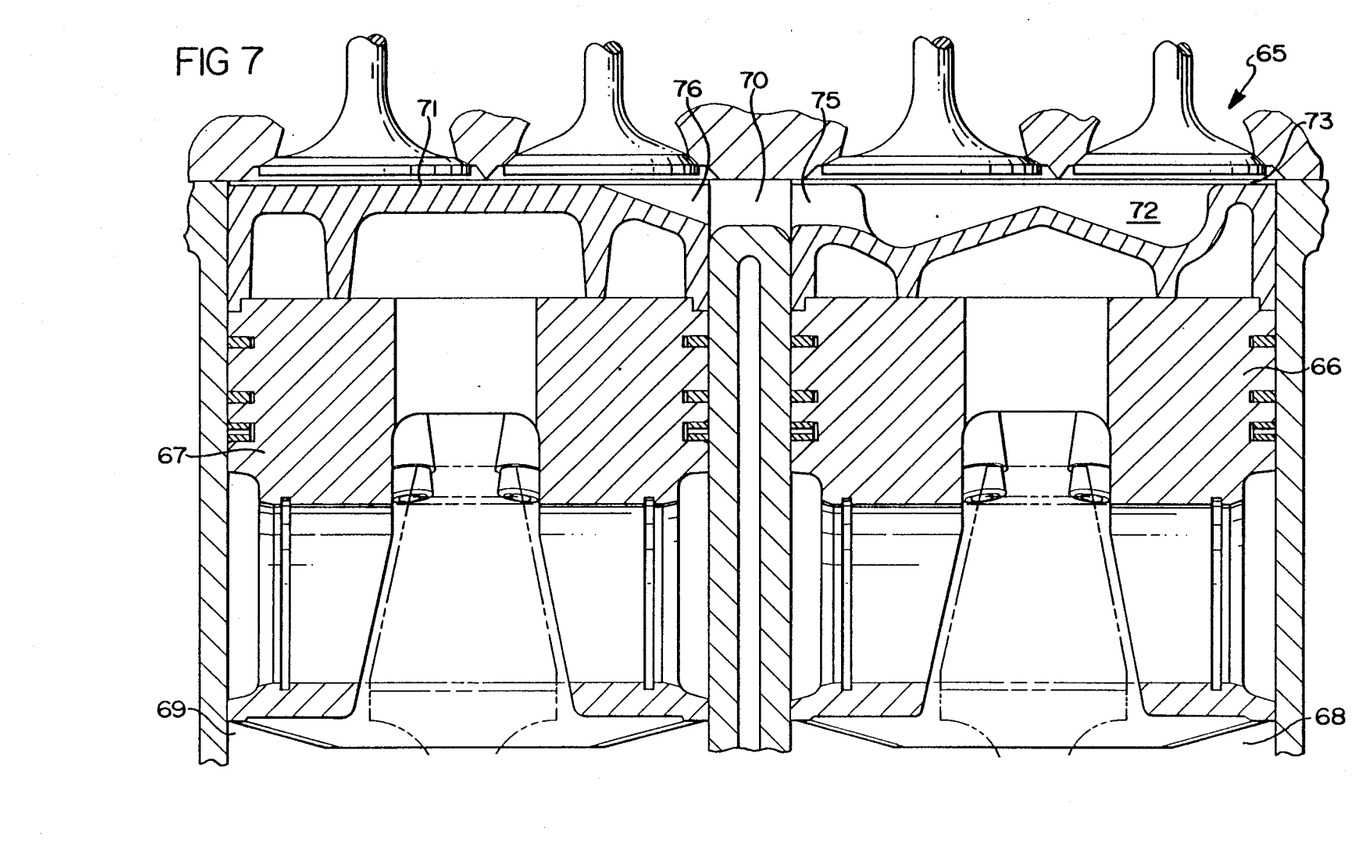
FIG. 7 is a fragmentary sectional view of the combustion chamber in a prototype VCR, CI type engine.
Figure 8:
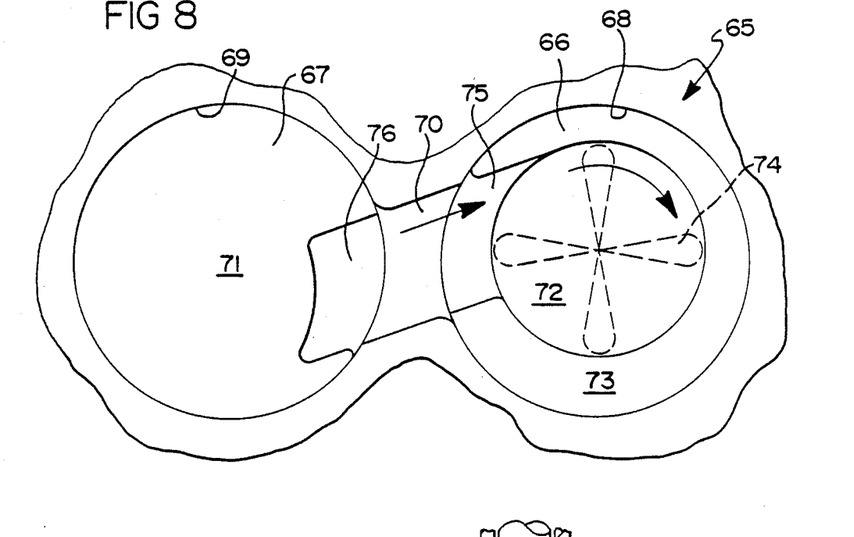
FIG. 8 is a fragmentary top elevational view of the interconnected cylinders in the engine of FIG. 7.

The two-cylinder prototype engine generally designated by reference numeral 65 in FIGS. 7 and 8 of the drawings has leading and trailing pistons 66, 67 operating in leading and trailing cylinders 68, 69 respectively. Said cylinders 68, 69 are interconnected by means of a transfer port 70 whose cross-sectional area is substantially smaller than the cross-sectional area of either cylinder 68, 69 interconnected thereby.

The combustion chamber of the prototype engine consisting of the two interconnected cylinders 68, 69 is designed to accommodate fuel injection into the leading cylinder 68 through a multi-hole fuel injector, not shown.

In order to maximize the amount of air available for combustion in the leading cylinder 68, the clearance volume of the trailing cylinder 69 is reduced to a practical minimum by forming a squish zone 71 over essentially the whole top surface of trailing piston 67. The resultant clearance volume of the leading cylinder 68 is concentrated in a toroidal bowl 72 situated in a generally central position in the crown of the leading piston 66 and surrounded by a squish zone 73. FIG. 7 illustrates the described clearance volume relationships by showing the leading and trailing pistons 66, 67 in their respective top dead center positions.

The multi-hole fuel injector, not shown, is positioned concentrically relative to bowl 72 as indicated by fuel sprays 74 outlined in FIG. 8.

In order to facilitate the flow of air from trailing cylinder 69 to leading cylinder 68 which occurs at the end of the compression phase and at the beginning of the expansion phase of the engine cycle, each piston 66, 67 includes an angled cutout 75, 76 respectively, shaped as an extension of angled transfer port 70. Said cross-flow of air is directed tangentially toward the side wall of the toroidal bowl 72 by the action of transfer port 70 and thus contributes to the intensity of the swirling motion of the charge in the leading cylinder 68, as indicated by arrows in FIG. 8.

Overall, the combustion system components incorporated in the leading cylinder of the prototype engine are configured in a manner typical of conventional, direct injection, CI engines, especially because the fuel is injected into a centrally located, toroidal, in-piston bowl surrounded by a squish zone. As evidenced below, this direct application of conventional technology to an unconventional combustion system of the divided chamber category has been unsuccessful.

Figures 9A, 9B:
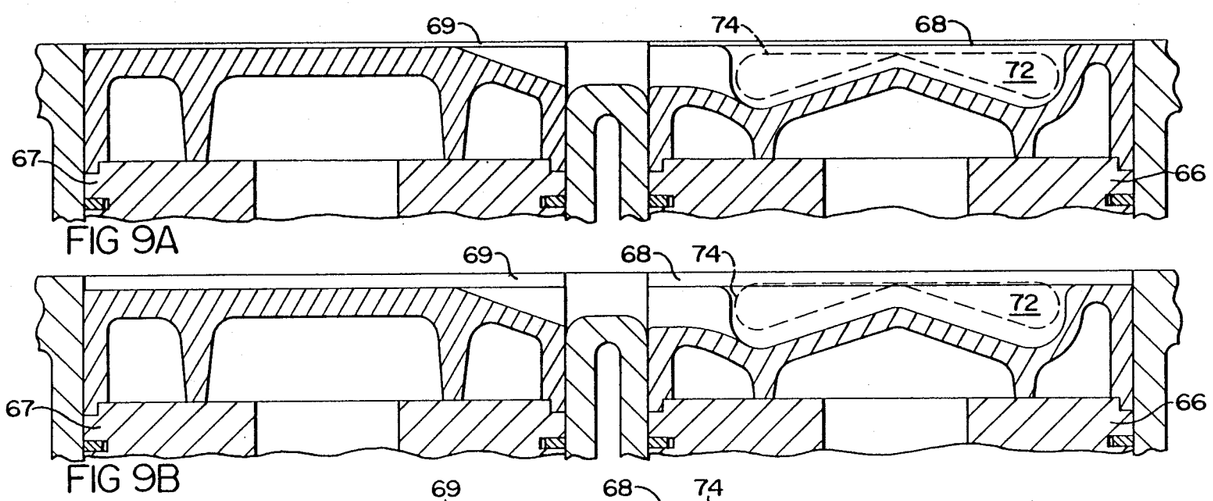
FIGS. 9A-9C are fragmentary sectional views of the combustion chamber in the engine of FIG. 7 at different phase shift angles.
Figure 9C:
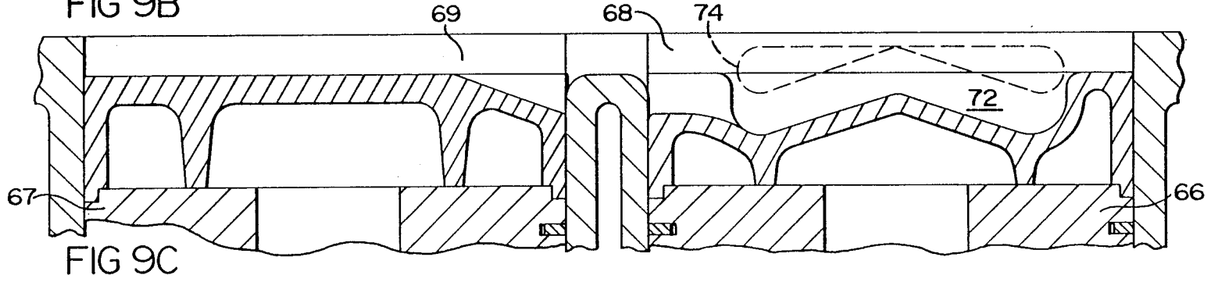

FIGS. 9A-9C illustrate the effect of the phase relation between the leading and trailing pistons 66, 67 of the said prototype engine on the position of the leading piston 66 relative to fuel sprays 74 at minimum combined cylinder volume. The relationships shown in FIGS. 9A-9C correspond to phase shift angles of 0, 25 and 50 degrees crank angle and compression ratios of 8.8, 14.7 and 19, respectively. They demonstrate that the greater the phase shift angle and the lower the CR, the further are both the leading and trailing pistons 66, 67 from their respective top dead center positions at the time the fuel is injected into the leading cylinder 68. As a result, at small phase shift angles the fuel is injected into the toroidal in-piston bowl 72 while at large phase shift angles the fuel is injected into the bore of the leading cylinder 68, as at the time of injection bowl 72 is no longer in the path of the fuel sprays 74. At intermediate phase shift angles, fuel injection takes place partially into the in-piston bowl 72 and partially into the bore of the leading cylinder 68.

The described stepwise variability of the combustion chamber shape in the said prototype engine is of such significance that known fuel injection systems are not capable of accommodating it. Consequently, if the combustion system is optimized at large phase shift angles, its performance is unsatisfactory at small phase shift angles, and vice versa. In fact, in the course of research conducted by the assignee of the present patent application using the said prototype engine, it was determined that the said stepwise changes of combustion chamber geometry associated with compression ratio variation have an overall detrimental effect on engine performance and exhaust emissions, especially on fuel efficiency and particulate emissions.

Figure 10A:
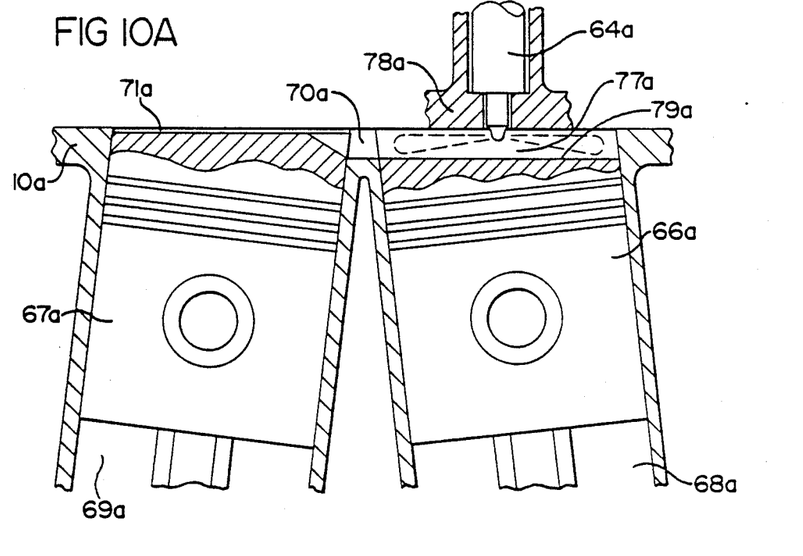
FIGS. 10A-10C are fragmentary sectional views of combustion chambers of the present invention.
Figure 10B:
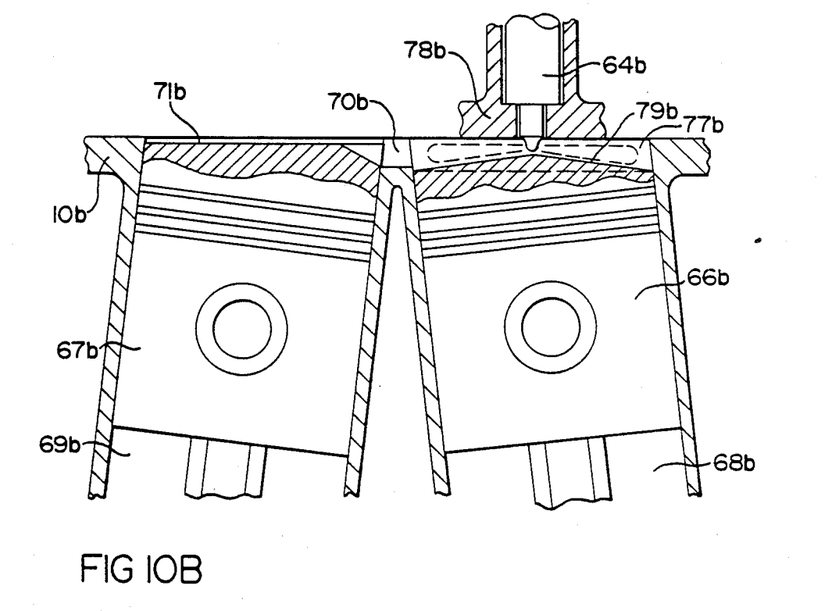
Figure 10C:
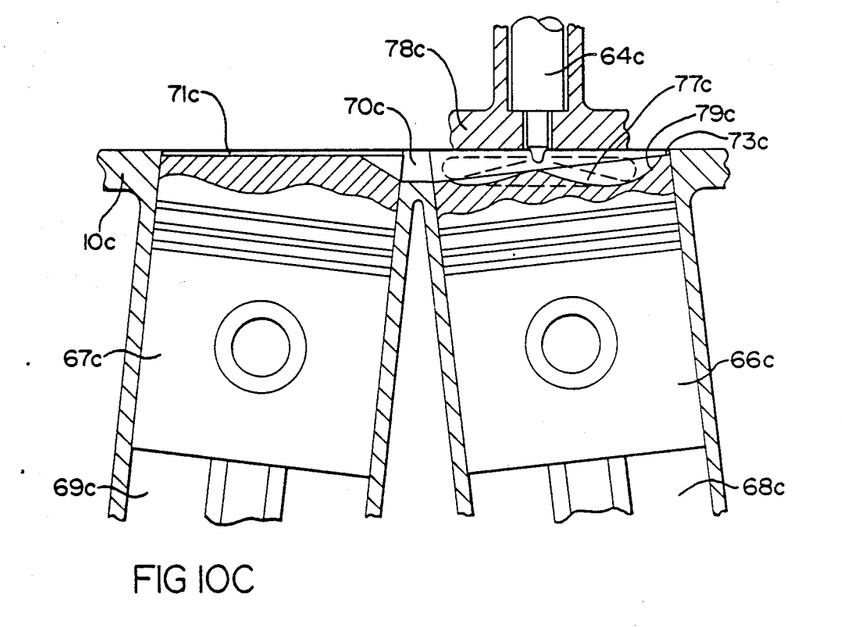

Referring to FIGS. 10A-10C, an alternative configuration of the combustion chamber is proposed in accordance with the present invention for reciprocating, CI, internal combustion engines of the aforementioned VCR category.

The illustrated embodiments of the invention are shown incorporated in pairs of interconnected leading and trailing cylinders 68, 69 arranged at an acute angle in engine block 10. This non-parallel cylinder arrangement is characteristic of the side-by-side layout of the leading and trailing crankshafts of the engine.

While eliminating the drawbacks of the combustion chamber design shown in FIGS. 7 and 8, the combustion chamber configuration of the present invention retains certain features thereof.

Firstly, the combined clearance volume of the leading and trailing cylinders 68, 69 is concentrated in the leading cylinder 68. For that purpose, the clearance volume of the trailing cylinder 69 at the top dead center position of the trailing piston 67 is reduced to a practical minimum value by forming a squish zone 71 over virtually the whole top surface of the said trailing piston 67.

Secondly, the cross-sectional area of transfer port 70 is substantially smaller than the cross-sectional area of either cylinder 68, 69 interconnected thereby.

Thirdly, the fuel is injected into the leading cylinder 68 by means of a centrally located fuel injector 64.

In the illustrated embodiments the diameters of leading and trailing cylinders 68, 69 are equal, the strokes of leading and trailing pistons 66, 67 are equivalent and the angular velocities of leading and trailing crankshafts of the engine are the same. However, other relationships between said parameters are contemplated within the scope of this invention.

Furthermore, for the purposes of simplifying the illustration, the intake and exhaust valves operating in the leading and trailing cylinders 68, 69 are not shown in FIGS. 10A-10C.

A feature of the present invention which differentiates it from the combustion chamber design shown in FIGS. 7 and 8 is that the combustion bowl situated in the leading cylinder 68 extends over substantially the whole top surface of the leading piston. The term combustion bowl is, for the purpose of the present patent application, defined as a chamber formed in the cylinder of a reciprocating, internal combustion engine, exclusive of the squish zones, at the top dead center position of the piston operating in that cylinder. Likewise, the term top surface of a piston in a reciprocating, internal combustion engine is defined as the piston surface facing the combustion chamber.

Referring again to FIGS. 10A-10C, the leading and trailing pistons 66, 67 are shown in their respective top dead center positions.

The top surfaces of leading pistons 66 in the illustrated embodiments are geometrically simple and either virtually or totally devoid of squish zones. Specifically, FIG. 10A shows a combustion bowl 77a of uniform height formed in the leading cylinder 68a between the plane surface of cylinder head 78a and plane top surface 79a of leading piston 66a.

The embodiment of FIG. 10B is the same as that shown in FIG. 10A except that the top surface 79b of leading piston 66b is conical with a centrally situated apex pointing at the fuel injector 64b.

The embodiment of FIG. 10C is like embodiments 10A and 10B except that the leading piston 66c has a toroidal top surface 79c whose axis is offset toward the transfer port 70c for the purpose of equalizing the height of the top piston land around the whole circumference of said piston 66c. The small squish zone 73c formed in the leading cylinder 68c opposite the transfer port 70c is contemplated within the scope of this invention.

In summary, the present invention eliminates the stepwise variability of the combustion chamber shape described in reference to the prototype engine developed by the assignee of this patent application. Consequently, it provides a solution to a problem hitherto unresolved and thus enables the development of fuel efficient, low emissions, reciprocating, CI, internal combustion engines of the described VCR category.

The present invention is equally applicable to two-stroke cycle and four-stroke cycle engines.

What is claimed is:

1. In a compression ignition internal combustion engine having at least one pair of cylinders, said at least one pair of cylinders consisting of a leading cylinder and a trailing cylinder, a leading piston operating in the leading cylinder and a trailing piston operating in the trailing cylinder, the leading cylinder interconnected with the trailing cylinder through a transfer port to permit the transfer of gases therebetween irrespective of the axial position of pistons operating therein, the cross-sectional area of said transfer port being substantially smaller than the cross-sectional area of either cylinder interconnected thereby, means to control the phase relation between the leading piston and the trailing piston for the purpose of varying compression ratio, fuel injection into the leading cylinder by means of a multi-hole fuel injector situated in a generally central position in said leading cylinder, the clearance volume of the trailing cylinder at the top dead center position of the trialing piston being at a practical minimum value, characterized by:
   a combustion bowl in the leading cylinder;
   said leading piston having a top surface;
   said combustion bowl in the leading cylinder extending over substantially the whole top surface of said leading piston.

* * * * *